(12) United States Patent
Coleman et al.

(10) Patent No.: US 11,502,533 B2
(45) Date of Patent: Nov. 15, 2022

(54) POWER CONVEYOR DEVICES FOR ENERGY HARVESTING SYSTEMS AND METHODS THEREOF

(71) Applicant: Intrinsix Corp., Marlborough, MA (US)

(72) Inventors: Edward Paul Coleman, Salt Springs, FL (US); Walter A. Budziak, Hanover, PA (US)

(73) Assignee: INTRINSIX CORP., Marlborough, MA (US)

( * ) Notice: Subject to any disclaimer, the term of this patent is extended or adjusted under 35 U.S.C. 154(b) by 0 days.

(21) Appl. No.: 16/786,593

(22) Filed: Feb. 10, 2020

(65) Prior Publication Data

US 2020/0259351 A1    Aug. 13, 2020

Related U.S. Application Data

(60) Provisional application No. 62/805,060, filed on Feb. 13, 2019.

(51) Int. Cl.
*H02J 7/00* (2006.01)
*H02J 7/35* (2006.01)
*H02J 50/20* (2016.01)

(52) U.S. Cl.
CPC .............. *H02J 7/0068* (2013.01); *H02J 7/35* (2013.01); *H02J 50/20* (2016.02); *H02J 2207/40* (2020.01)

(58) Field of Classification Search
CPC .......... H02J 50/001; H02J 7/0068; H02J 7/35; H02J 50/20; H02J 2207/40; H02J 50/00; H02J 50/30; H02J 2207/20; H02J 3/34; H02M 1/0009; H02M 3/07; H02M 1/08; H02M 3/158; H02M 3/1582; H02M 7/483; H02M 1/00; H02M 3/1552
See application file for complete search history.

(56) References Cited

U.S. PATENT DOCUMENTS

| | | | |
|---|---|---|---|
| 5,850,113 A | 12/1998 | Weimer et al. | |
| 8,004,117 B2* | 8/2011 | Adest | H02J 1/12 307/80 |
| 8,188,703 B2* | 5/2012 | Chen | G05F 1/67 320/101 |
| 8,392,030 B2* | 3/2013 | Anderson | B60L 7/003 700/286 |
| 8,823,210 B1 | 9/2014 | Olah et al. | |
| 9,063,559 B2* | 6/2015 | Ivanov | H02J 7/35 |
| 9,106,105 B2 | 8/2015 | Mccaslin et al. | |
| 9,343,967 B2* | 5/2016 | Shao | H02M 3/158 |

(Continued)

*Primary Examiner* — Helen Rossoshek
(74) *Attorney, Agent, or Firm* — Troutman Pepper Hamilton Sanders LLP (Rochester)

(57) ABSTRACT

A power conveyor circuit for an energy harvesting system includes an input port configured to be electrically coupled to a sensor to receive an input signal from the sensor at an input power level and an output port configured to 5 be electrically coupled to a load. A switch mode power path circuit is coupled to the input port and the output port to receive the input signal from the sensor received at the input port and to provide an output signal to the output port at an output power level equal to the input power level times a transfer efficiency. A method of making the power conveyor circuit and an energy harvesting system including the power conveyor circuit are also disclosed.

15 Claims, 9 Drawing Sheets

(56) References Cited

U.S. PATENT DOCUMENTS

| | | | |
|---|---|---|---|
| 9,373,964 B2 | 6/2016 | Subramaniam et al. | |
| 9,450,489 B2 | 9/2016 | Gasparini et al. | |
| 9,537,386 B2 | 1/2017 | Herfurth et al. | |
| 9,557,758 B2 | 1/2017 | Stratakos et al. | |
| 9,748,838 B2 | 8/2017 | Chew et al. | |
| 9,806,604 B2 * | 10/2017 | Delos Ayllon | H05B 45/3725 |
| 9,870,016 B2 * | 1/2018 | Adest | H02J 3/385 |
| 2010/0002470 A1 | 1/2010 | Kiamilev et al. | |
| 2012/0175963 A1 * | 7/2012 | Adest | H02M 7/42 |
| | | | 307/82 |
| 2013/0027979 A1 | 1/2013 | Phadke | |
| 2014/0103894 A1 | 4/2014 | Mcjimsey et al. | |
| 2017/0338735 A1 * | 11/2017 | Alarcon-Cot | H05B 45/38 |

* cited by examiner

POWER CONVEYOR DEVICES FOR ENERGY HARVESTING SYSTEMS AND METHODS THEREOF

This application claims the benefit of U.S. Provisional Patent Application Ser. No. 62/805,060, filed Feb. 13, 2019 which is hereby incorporated by reference in its entirety.

FIELD

The present technology relates to a power conveyor device for energy harvesting systems, energy harvesting systems incorporating the power conveyor device, and methods of use thereof.

BACKGROUND

Energy harvesting systems may be utilized to harvest energy from various energy sources, such as solar, wind, vibration, and radiofrequency energy. A typical energy harvesting system includes a sensor or sensor array, a power converter, an efficiency optimizer, and an energy storage device or load to be powered using the harvested energy.

The sensor, or sensor array, collects available energy from the energy source and provides the energy to the power converter. The power converter then converts the received energy to a usable form, such as a current or a regulated voltage, for the energy storage device or load employed. The energy storage device may be a battery, a capacitor, a super capacitor, or a filter cap. The energy storage device can be used to supply energy to a load. The energy harvesting system further includes an efficiency optimizer to optimize efficiency of the system as the levels of harvested energy are varied. The efficiency optimizer optimizes the efficiency of the system by adjusting the impedance or sensor voltage for a given received energy level. This optimization is also known as maximum power point tracking.

Current power converters used in energy harvesting systems utilize an input power level that is a reflection of the required load power. The output of the power converter is thus disadvantageously constrained to a specific voltage, or current level, based on the input power.

SUMMARY

A power conveyor circuit for an energy harvesting system includes an input port configured to be electrically coupled to a sensor to receive an input signal from the sensor at an input power level and an output port configured to be electrically coupled to a load. A switch mode power path circuit is coupled to the input port and the output port to receive the input signal from the sensor received at the input port and to provide an output signal to the output port at an output power level equal to the input power level times a transfer efficiency.

An energy harvesting system includes a sensor configured to harvest energy. A power conveyor circuit is electrically coupled to the sensor at an input port to receive an input signal from the sensor at an input power level and an output port configured to be electrically coupled to a load. A switch mode power path circuit is coupled to the input port and the output port to receive the input signal from the sensor received at the input port and to provide an output signal to the output port at an output power level equal to the input power level times a transfer efficiency.

A method of making a power conveyor circuit includes providing an input port configured to be electrically coupled to a sensor to receive an input signal from the sensor at an input power level and an output port configured to be electrically coupled to a load. A switch mode power path circuit is coupled to the input port and the output port to receive the input signal from the sensor received at the input port and to provide an output signal to the output port at an output power level equal to the input power level times a transfer efficiency.

The disclosed power conveyor circuit advantageously allows for receiving harvested energy at a prescribed impedance level to maximize harvesting efficiency. The received energy from the sensor or power source that harvests the energy is transferred to the output while optimizing transfer efficiency. The power conveyor circuit is capable of receiving sensor current over a range of voltage levels and can regulate the input voltage level to match a maximum power point tracking demand signal. The power conveyor transfers the received energy from the sensor to the output in current form at high efficiency. The energy received from the sensor or power source is transferred to the output where the energy can be stored, applied to address a load, or shunted to the ground to maintain voltage regulation.

DETAILED DESCRIPTION

Figure 1:
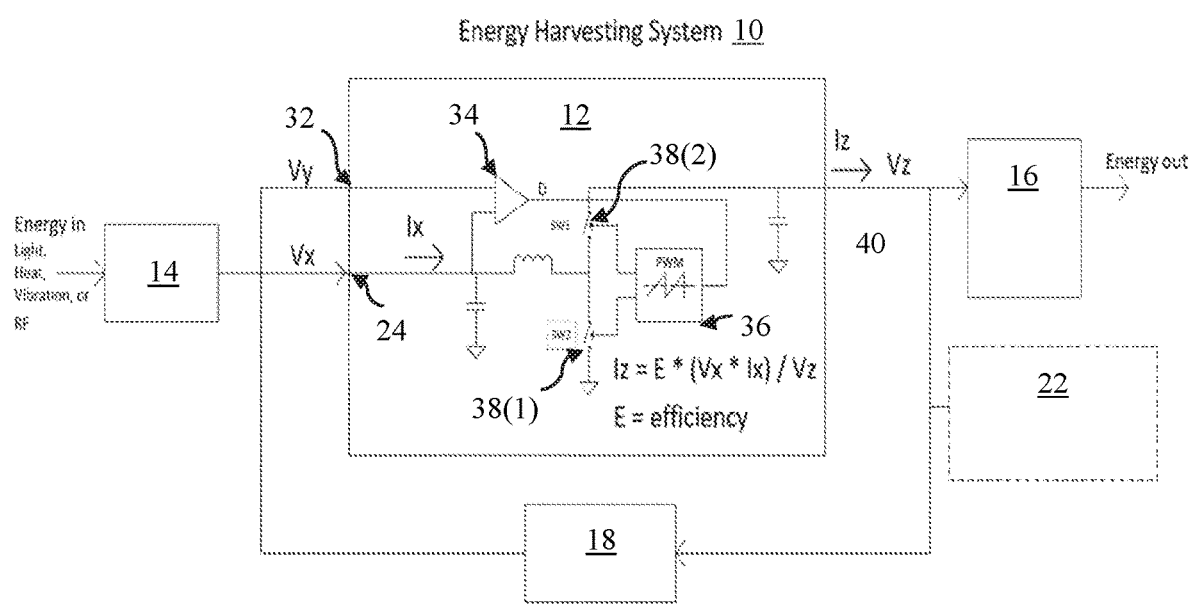
FIG. 1 is a block diagram of an energy harvesting system including a power conveyor circuit.
Figure 2:
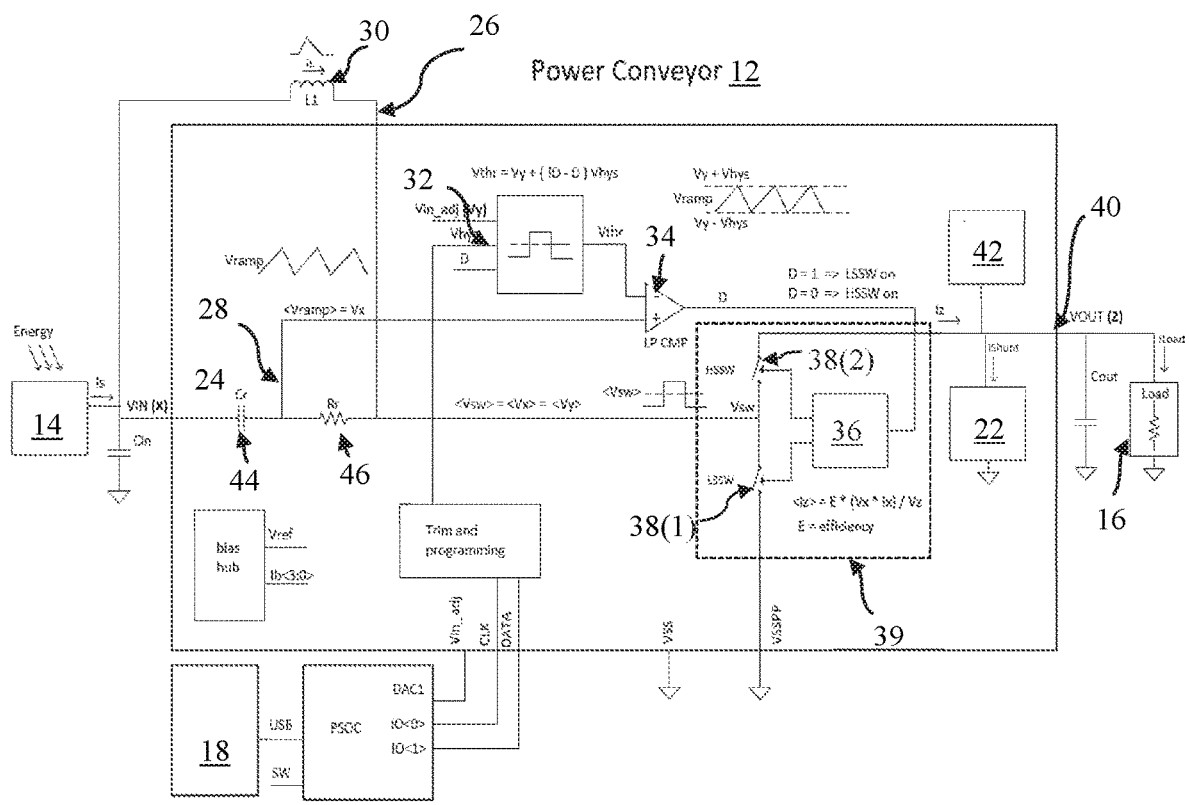
FIG. 2 is a detailed schematic of the exemplary energy harvesting system shown in FIG. 1.

An example of an energy harvesting system 10 incorporating a power conveyor circuit 12 of the present technology is illustrated in FIGS. 1 and 2. In this particular example, the energy harvesting system 10 includes the power conveyor circuit 12 coupled to a sensor 14 that acts as a power source, a load 16, such as an energy storage device, and an efficiency optimizer 18, although the energy harvester system 10 may include other types and/or numbers of elements or components in other configurations, such as by way of example only, an optional shunt regulator 22 as shown in FIG. 1. The use of the power conveyor circuit 12 of the present technology in the energy harvesting system 10 advantageously allows for harvested energy to be received at a prescribed impedance level to maximize harvesting efficiency of the energy harvesting system 10.

The exemplary power conveyor circuit 12 employed in the energy harvesting system 10 shown in FIGS. 1 and 2 provides a number of advantages including the capability to receive sensor current from the sensor 14 over a range of voltage levels. The power conveyor circuit 12 can also regulate the input voltage level to match a demand signal from the efficiency optimizer circuit 18. The power conveyor circuit 12 advantageously transfers the received energy to the output in current form at high efficiency. By way of example, efficiencies of approximately 99 percent are achievable in certain examples. The current can applied to the load 16, such as to charge a battery or charge a filter cap with voltage regulation provided by the shunt regulator 22 as shown in FIG. 1. The energy received by the power conveyor circuit 12 is transferred to the output where the energy is stored, applied to address the load 16, or in the case where the energy storage element is full and the received energy exceeds the load demand, shunted to ground to maintain voltage regulation.

Referring again to FIGS. 1 and 2, the sensor 14 in the energy harvesting system 10 provides a power source for the energy harvesting system 10 to provide energy to the load 16 employed as described below. The sensor 14 can be any sensor or sensors configured to receive energy from an energy source in the environment and convert the energy to a sensor current. By way of example, the sensor 14 may be configured to be utilized with energy sources, such as solar, wind, vibration, and/or radiofrequency energy, although any other type of sensors that can generate a current based on an energy source known in the art may be utilized. In one example, sensor 14 can be an array of sensors to convert energy harvested from the energy source to the sensor current. In this example, the array of sensors can include various types of sensors used to harvest one or more types of energy from the environment. The sensor 14 is coupled to the power conveyor circuit 12 at an input port 24 of the power conveyor circuit 12 to provide an input sensor current ($I_x$) to the power conveyor circuit 12.

Referring now more specifically to FIG. 2, the power conveyor circuit 12 in this example includes the input port 24, a switch node 26 including a DCR network 28 and an inductor 30, a control input 32, a low power comparator 34, a pulse width modulator 36, a pair of switches 38(1) and 38(2), and an output port 40, although the power conveyor circuit 12 may include other types and/or numbers of elements in other configurations, such as additional electronics or other circuitry, including a start-up circuit 42, as shown in FIG. 2, and the shunt regulator 22, by way of example only. The power conveyor circuit 12 is designed to meet the power transfer requirements of the energy harvesting system 10. The power transfer requirements may be determined by the power required for the load 16 applied, by way of example. Unlike currently available DC-DC power converters, the input power level of the power conveyor circuit 12 is not a reflection of the required power for the load 16. Instead, the output power level of the power conveyor circuit 12 is a reflection of the input power received. That is, the output power is equal to the input power minus losses due to efficiency. All power received at the input port 24 of the power conveyor circuit 12 is conveyed to the output port 40 of the power conveyor circuit 12 regardless of the load 16 coupled to the output port 40.

For example, if the input power is 100 mW, and the power conveyor circuit is 90% efficient, then the output power is 90 mW. As a result, if the user sets the voltage at the output port 40 to 2 volts, the current at the output port 40 will be equal to Pout/Vz or 45 mA. However, if instead, the user sets the load on the output port 40 to a constant current of 20 mA, then Vz will equal Pout/Iz or 4.5 volts. Accordingly, in this example the output is not constrained to a specific voltage or current level. Instead, the output is constrained by the power level 24 received from the sensor 14 at the input port 24.

Referring again to FIGS. 1 and 2, in this example, the input port 24 is configured to be electrically coupled to the sensor 14 or power source, such as a sensor array by way of example. The input port 24 is configured to receive an input signal in the form of the input current ($I_x$) generated by the power source or sensor 14 as the sensor 14 harvests energy from the environment. In this example, the power conveyor circuit 12 is capable of receiving the input current ($I_x$) from the sensor 14 over a range of voltage levels ($V_x$).

Figure 9:
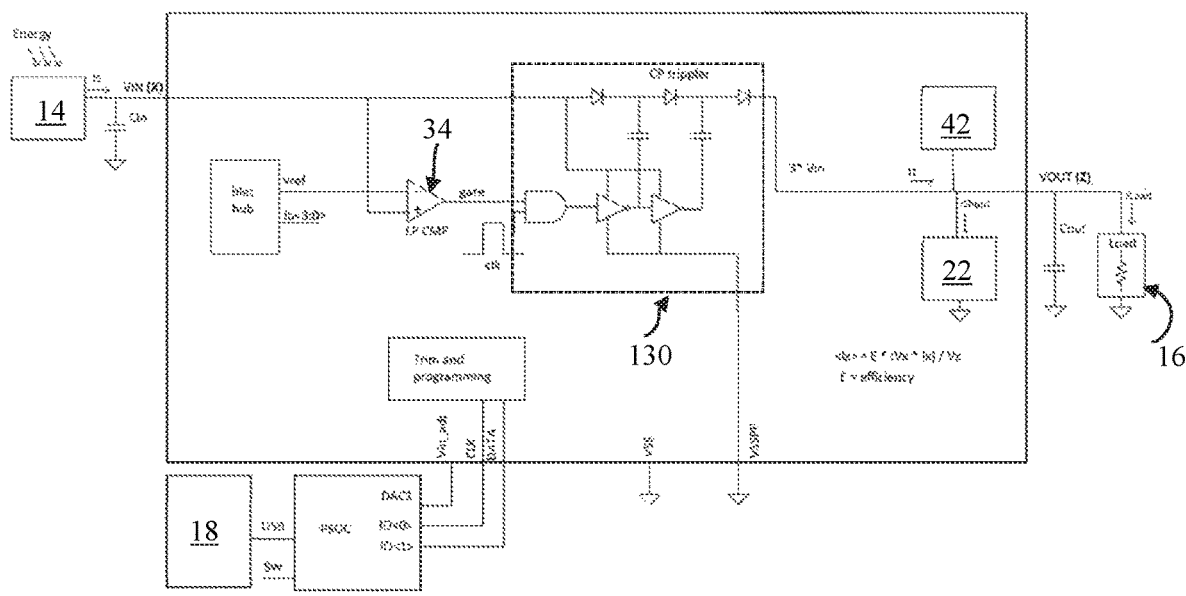
FIG. 9 is a schematic of another example energy harvesting system with a charge pump.

The input port 24 is electrically coupled to the switch node 26. The switch node 26 includes the DCR network 28, which includes capacitor 44 and resistor 46. In this example, the switch node 26 also includes the inductor 30, which is positioned to receive the current flow ($I_x$) under certain conditions as described with examples in further detail below. The input port 24 is also electrically coupled to the low power comparator 34 such that as current increases in the inductor 30, the DCR network 28 provides a ramp signal ($V_{ramp}$) to the low power comparator 34 that is proportional to the current level of the inductor 30. The ramp signal ($V_{ramp}$) is inverted, and decreases as the inductor current increases. In one example, the power conveyor circuit 12 does not include the inductor 30, and instead includes charge pump capacitors 130 as shown in FIG. 9. In that example, the buck or boost is replaced by the charge pump capacitors 130.

Referring again to FIGS. 1 and 2, the control input 32 is configured to receive a control voltage ($V_y$) from the efficiency optimizer 18, such as an external controller as shown in FIG. 2, and impose the control voltage on the input port 24 such that the voltage at the input port 24 is equal to the control voltage ($V_y$). The control voltage ($V_y$) provides a prescribed impedance level, based on the maximum power point tracking function as described below, to maximize harvesting efficiency of the energy harvesting system 10. In this example, the power conveyor circuit 10 regulates the input voltage level ($V_x$) to match a maximum power point tracking (MPPT) demand signal from the efficiency optimizer 18, such as employed by the external controller, provided to the control input 32, as described in further detail below. The control input 32 is also electrically coupled to the low power comparator 34 to provide the control voltage ($V_y$) to the low power comparator 34.

In this example, the low power comparator 34 is positioned to receive both the voltage at the input port ($V_x$) from the input port 24 and the control voltage ($V_y$) from the control input 32. The low power comparator 34 is coupled to the pulse width modulator 36 provide an output (D) that controls the duty cycle of the pulse width modulator 36, as described in further detail below. The voltage at the control input 32 is imposed on input port 24 by the voltage regulation loop with the demand level set by the voltage at the control input 32. The voltage ($V_x$) at input port 24 provides the feedback to allow the low power comparator 34 to provide the output (D) to set the duty cycle of the pulse width modulator 36. The output (D) controls the duty cycle of the pulse width modulator 36 to maintain $V_x$ equal to $V_y$ (average voltage ($V_{sw}$) is equal to $V_{thr}$, not instantaneous) as described in further detail below. The power conveyor circuit 12 is configured such that when the output (D) of the low power comparator 36 goes low, the low side switch 38(1) is turned off and the high side switch 38(2) turns on.

When the low side 38(1) switch is on, the input current ($I_x$) is imposed across the inductor 30 and the current is efficiently stored in the inductor 30. When the output (D) of the low power comparator 36 goes high, the low side switch 38(1) is turned on and the high side switch 38(2) turns off and the next energy pulse is delivered.

Figure 3:
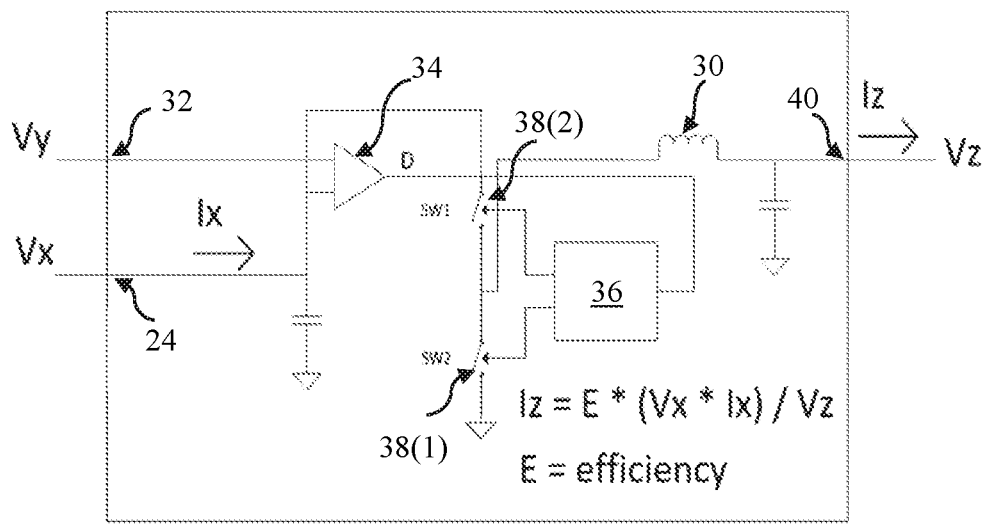
FIG. 3 is a schematic of another exemplary power conveyor circuit that may be employed in the energy harvesting system shown in FIGS. 1 and 2.
Figure 4:
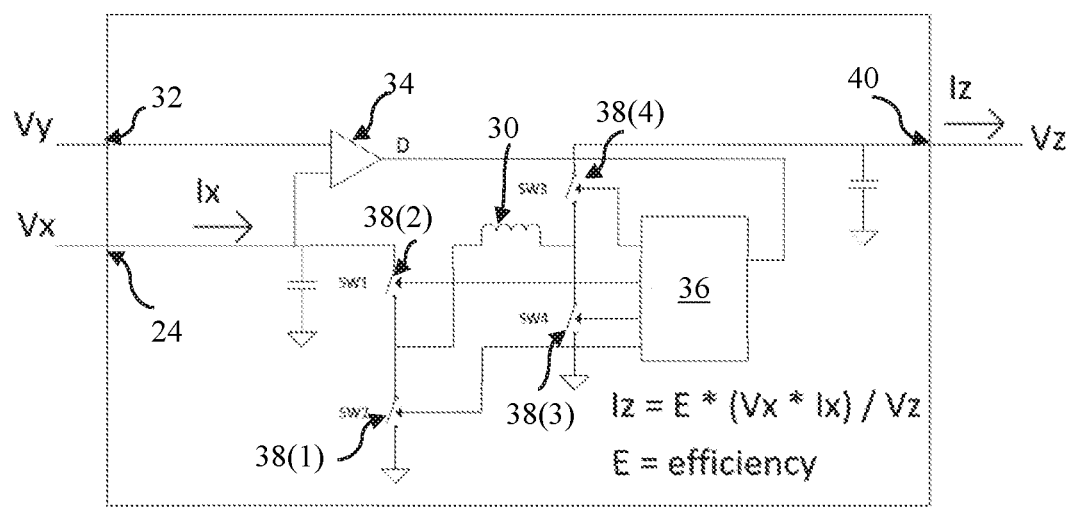
FIG. 4 is a schematic of yet another exemplary power conveyor circuit that may be employed in the energy harvesting system shown in FIGS. 1 and 2.

In this example, the pulse width modulator 36 includes a break before make (BBM) and tristate (Tri) switch control, although other pulse width modulator configurations may be employed to control the switches 38(1) and 38(2). The combination of the pulse width modulator 36 and the switches 38(1) and 38(2) provides a switch mode power path circuit 39 that is configured to transfer energy from the input port 24 to the output port 40 with the power delivered to output port 40 as an output current ($I_z$). In this example, as shown in FIGS. 1 and 2, the switch mode power path circuit 39 includes the switches 38(1) and 38(2) and the pulse width modulator 36, although the switch mode power path circuit 39 may include additional elements and/or components in other configurations. In this example, the switches 38(1) and 38(2) and the pulse width modulator 36 are located between the inductor 30 and the output port 40. As a result, in this example $V_z$ must be greater than $V_x$. In an alternative example, as shown in FIG. 3, if the pulse width modulator 36 is placed between the input port 24 and the inductor 30, $V_x$ must be greater than $V_z$. In yet another example, as shown in FIG. 4 a four switch modulator configuration including switches 38(1)-38(4) is utilized. In this example, a full range of conversion voltage levels are possible, although efficiency is decreased due to the higher number of switches.

Referring again to FIGS. 1 and 2, the power conveyor circuit 12 is coupled to the efficiency optimizer 18, which is configured to provide a demand voltage ($V_Y$) to the control input 32. In one example, the demand signal is provided by efficiency optimizer, which is an external controller as shown in FIG. 2 coupled to a D/A converter, that provides a maximum power point tracking (MPPT) demand signal. The demand signal is provided to the control input 32, as described in further detail below. In another example, the efficiency optimizer 18 may alternatively be a constant voltage source where the amount of energy delivered from the sensor 14 is relatively constant.

Figure 5:
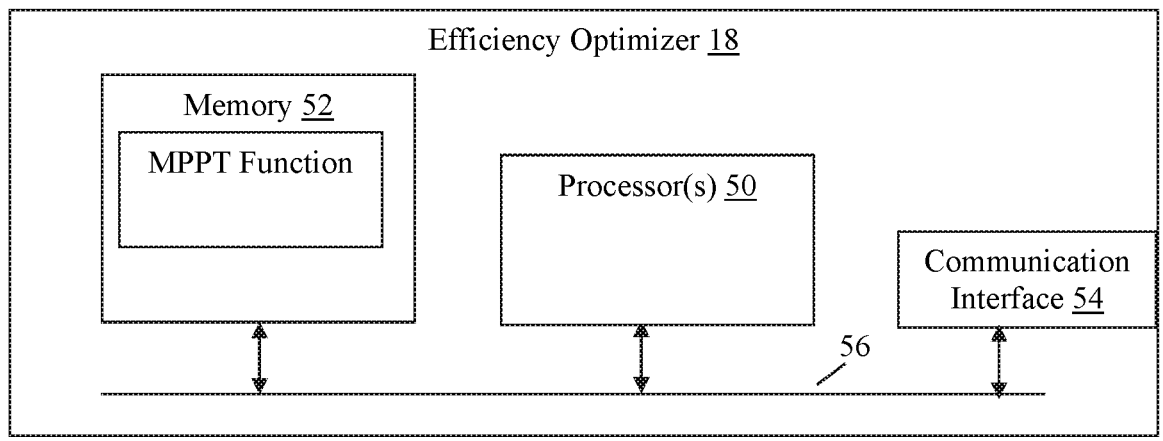
FIG. 5 is block diagram of an exemplary efficiency optimizer computing device that may be employed in the energy harvesting system shown in FIGS. 1 and 2.

Referring now more specifically to FIGS. 2 and 5, in one example, the efficiency optimizer 18 is provided by an external controller that controls one or more operations of the power conveyor circuit 12. Referring now more specifically to FIG. 5, in this example, the efficiency optimizer 18 is a controller that includes one or more processor(s) 50, a memory 52, and/or a communication interface 54, which are coupled together by a bus 56 or other communication link, although the efficiency optimizer 18 can include other types and/or numbers of elements in other configurations. In one example, the efficiency optimizer 18 is a microcontroller that is integral to the energy harvesting system 10, although in other examples, the efficiency optimizer 18 may be separate from the energy harvesting system 10.

The processor(s) 50 of the efficiency optimizer 18 may execute programmed instructions stored in the memory 52 for the any number of the functions described and illustrated herein. In one example, the processor(s) 50 provides instructions to provide a voltage input to the control input 32 to obtain MPPT, as described in examples in further detail below. The processor(s) 50 may include one or more CPUs, GPUs, or general-purpose processors with one or more processing cores, for example, although other types of processor(s) can also be used. The processor(s) 50 may also be artificial intelligence (AI) processor(s) that include deep learning technology, such as neural networks, for example.

The memory 52 stores these programmed instructions for one or more aspects of the present technology as described and illustrated herein, although some or all of the programmed instructions could be stored elsewhere. A variety of different types of memory storage devices, such as random-access memory (RAM), read-only memory (ROM), hard disk, solid state drives, flash memory, or other computer readable medium which is read from and written to by a magnetic, optical, or other reading and writing system that is coupled to the processor(s) 50, can be used for the memory 52.

Accordingly, the memory 52 of the efficiency optimizer 18, in this example, can store one or more applications or programs that can include computer executable instructions that, when executed by the efficiency optimizer 18, cause the efficiency optimizer 18 to perform actions described and illustrated below. The application(s) can be implemented as modules, threads, pipes, streams, or components of other applications. Further, the application(s) can be implemented as operating system extensions, module, plugins, or the like.

Even further, the application(s) may be operative in a cloud-based computing environment. The application(s) can be executed within or as virtual machine(s) (VM[s]) or virtual server(s) that may be managed in a cloud-based computing environment. Also, the application(s) may be running in one or more VMs executing on the efficiency optimizer 18.

In another example, the efficiency optimizer 18 is a highly integrated microcontroller device with a variety of onboard hardware functions, such as ADCs, digital-to-analog converters (DACs), serial buses, general purpose I/O pins, RAM, and ROM.

Although the exemplary efficiency optimizer 18 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the efficiency optimizer 18. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, packet data networks (PDNs), the internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Referring again to FIGS. 1 and 2, in this example, the load 16 is an energy storage device, such as a battery, capacitor, or super capacitor, by way of example only, located at the output port 40 of the power conveyor circuit 12. The switch mode power path circuit 39 provides an output signal to the output port 40 at an output power level. The energy received at the input port 24 from the sensor 14 is transferred to the output port 40 to the load 16 through the switch mode power path circuit 39. The power conveyor circuit 12 transfers the received energy to the output (Z) in current form at high efficiency. When the load 16 is a battery coupled to the output port 40, the voltage at the output port 40 is determined by the voltage of the battery, and the current level is determined by the power level at the output port 40, which is determined by the power level at the input port 24 minus conduction and switching losses in the switch mode power path circuit 39. The output current can be used to charge a battery or charge a filter cap with voltage regulation provided by the shunt regulator 22, as described in further detail below. All energy received is transferred to the output port 40 where the energy is stored, applied to address the load 16, or in the case where the storage element is full, and the received energy exceeds the demand of the load 16, shunted to ground to maintain voltage regulation. When the output port 40 is connected to the load, which is a current source, the voltage level is determined by the power level at the output port 40. As described below, the power conveyor circuit 12 may be used with a variety of energy sources.

In this example, the power conveyor circuit 12 may be used in conjunction with the shunt regulator 22 to provide power to the load 16, and maintain output voltage regulation. This technique is useful for applications where the power required by the load 16 does not exceed the received power level minus any conversion losses. When input power exceeds the requirements of the load 16, input power must be dissipated with an input side shunt. The advantage provided by the power conveyor circuit 12 is that MPPT input side voltage regulation is inherent. Devices without input side regulation require a secondary loop that must be added to enable and disable the load path to dither the MPPT voltage level between two set points. Such devices also suffer from collapse when the input sensor power decreases below the level that is needed for the load. This causes the input cap to discharge to a lower voltage level. When the power level is restored, the input voltage is too low for efficient operation, and the device does not recover. Instead the input cap continues to discharge, and the device collapses. The power conveyor circuit 12 advantageously maintains the input voltage at the MPPT voltage set point as power decreases, and when received power is restored, the energy harvesting system 10 returns to an efficient level at the MPPT set point.

Figure 6:
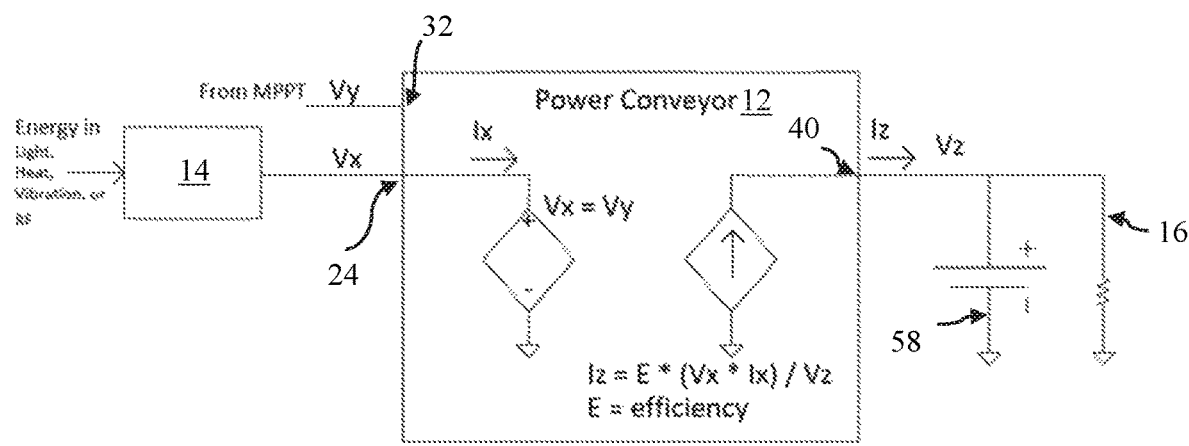
FIG. 6 is a schematic of another example use of an exemplary power conveyor circuit hard wired to a fixed voltage source at the point of load.

Referring now to FIG. 6, in yet another example, the power conveyor circuit 12 may be hard wired to a fixed voltage source 58 at the point of load in addition to the load 16, which is not possible with energy harvesting circuits where the output is voltage regulated. This increases the efficiency of the power conveyor circuit 12 path by avoiding losses due to the need to have a regulator between the fixed voltage source 58 and the load 16. In one example, the power conveyor circuit 12 can be hard wired to a large energy storage capacitor. In this configuration, the energy in the input capacitor is not depleted by the coupling to the energy storage capacitor because the power conveyor circuit 12 only charges the output capacitor at a rate that available harvested energy is used. Thus, the input capacitor is not depleted.

Figure 7:
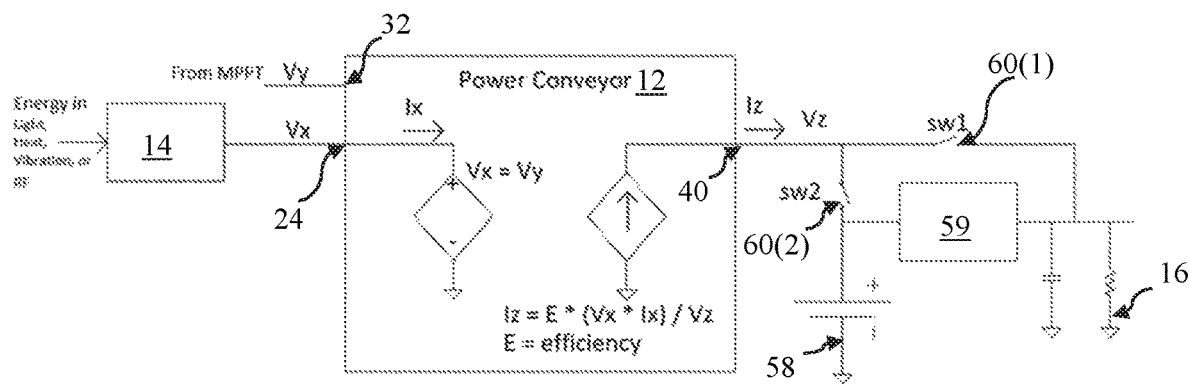
FIG. 7 is a schematic of another example of an exemplary power conveyor circuit hard wired to a fixed voltage source at the point of load or battery with switches to determine which path is enabled to harvest energy.

Referring now to FIG. 7, in a further example, the power conveyor circuit 12 may be hard wired to the fixed voltage source 58 at the point of load or battery with switches 60(1) and 60(2) to determine which path is enabled to harvest energy. This increases the efficiency of the energy harvester power path of the power conveyor circuit 12 by avoiding the losses due to regulator 59, which may be a buck, a boost, or a low drop-out regulator, between the fixed voltage source 58 and the load 16, and provides a path to direct harvested energy to the fixed voltage source 58, such as a battery, if the load 16 is too light or disabled (sleep mode).

Figure 8:
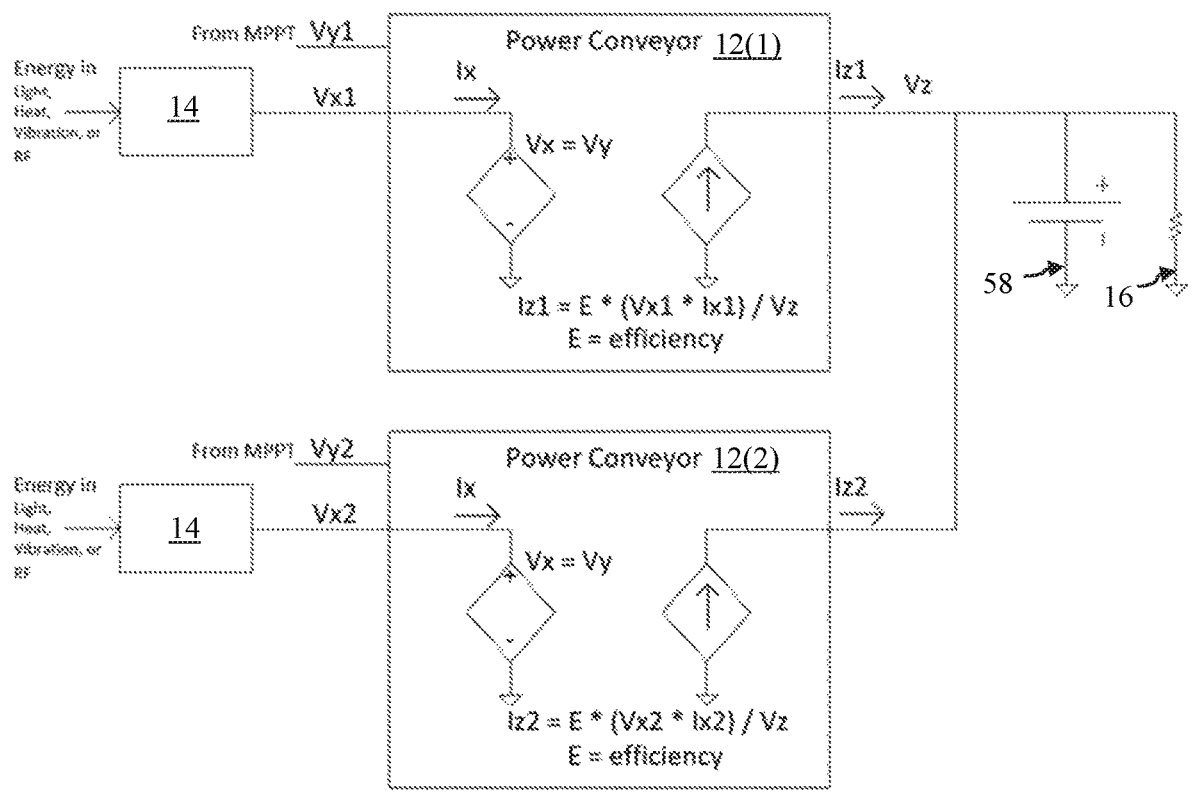
FIG. 8 is a schematic of another example energy harvesting system including multiple power conveyor circuits.

Referring now to FIG. 8, in another example, multiple power conveyor circuits 12(1) and 12(2) can be hard wired to a single output port 40 to combine various energy harvesting paths to supply energy to a single energy storage device or point of load 16, without the need for additional circuitry. Although two power conveyor circuits are shown, other numbers of power conveyor circuits in combination may be contemplated.

An exemplary operation of the energy harvester system 10 with the power conveyor circuit 12 of the present technology will now be described with reference to FIGS. 1 and 2. The input port 24 receives an input signal in the form an input current ($I_x$) generated by the power source or sensor 14 as the power source or sensor 14 harvests energy from the environment. The input port 24 receives the input current ($I_x$) at an input power level ($P_{IN}$).

The control input 32 provides a voltage demand or command voltage ($V_y$) that imposes a voltage on the signal delivered to the input port 24 during operation of the power conveyor circuit 12 from the efficiency optimizer 18. In one example, the efficiency optimizer 18 is an external controller that is configured to dither the command voltage to optimize the energy extraction through maximum power point tracking (MPPT), as is known in the art.

It is important to obtain an impedance match between the sensor 14 and the power conveyor circuit 12 to optimize the power output level of the sensor 14 for a given received power level. This is often done by adjusting the voltage level at the sensor 14 until the power throughput is maximized. MPPT is implemented using the perturbation method, which is to make small variations in the sensor 14 voltage level ($V_x$), while simultaneously monitoring the rate of power transfer from $V_x$ to $V_z$. The polarity of the perturbation that results in an increase in power throughput determines the new voltage level for $V_x$. The power level can be calculated by monitoring the output voltage times the output current.

If the system is at the MPPT level, a decrease in power throughput is indicative of a received power level change. It is necessary to alter the MPPT voltage level to determine whether the MPPT voltage needs to be increased or decreased to obtain MPPT again. If the MPPT voltage setting is decreased, and the power throughput decreases, then it indicates that the new MPPT set point needs to be higher than the original MPPT set point. If instead, the power throughput increases, then it indicates that the new MPPT set point needs to be lower than the original MPPT set point. Pulse density may be measured by counting pulses over a set time period, or by measuring the length of time between pulses, which requires a low power reference clock.

The voltages from the input port 24 and the control input 32 are provided to the low power comparator 34, which provides an output (D) to control the duty cycle of the pulse width modulator 36. In one example, the efficiency is optimized by the efficiency optimizer 18 adjusting the voltage at the with a demand signal at Y provided by the MPPT function, and by utilizing the switch mode power path circuit 39 to transfer energy.

The output (D) of the low power comparator 34 controls the duty cycle of the pulse width modulator 36 to maintain $V_x$ equal to $V_Y$. When the output (D) of the low power comparator 34 goes low, low side switch 38(1) is turned off and high side switch 38(2) turns on, which discharges the inductor 30, transferring energy to the output port 40. When the output (D) of the low power comparator 34 goes low, the high side switch 38(2) remains on until the demand voltage is met, or the inductor 30 level reaches zero. When the demand voltage is reached, the output (D) goes high and the low side switch 38(1) is turned on. When the low side switch 38(1) is on, the input current (Ix) is imposed across the inductor 30 and the current is efficiently stored in the inductor 30. When the output (D) of the low power comparator 34 goes high, the low side switch 38(1) is turned on and the high side switch 38(2) turns off and the next energy pulse is delivered. As the power level of the sensor 14 increases at the input port 24, the pulse density increases, and vice versa.

In this example, the shunt regulator 22 limits the maximum voltage at $V_z$ by dissipating excess energy that would otherwise overcharge the $V_z$ storage capacitor, and damage sensitive circuitry in the load 16. The startup circuit 42 provides for power transfer only if there is sufficient $V_z$ voltage to operate the power conveyor circuit 12. This example may also include a bandgap reference and bias hub to support control circuitry.

The power conveyor circuit 12 transfers the received energy from the sensor 14 to the output in current form at high efficiency. The current can be used to charge the load 16, such as a battery, or charge a filter cap with voltage regulation provided by the shunt regulator 22. The energy received by the power conveyor circuit 12 is transferred to the output port 40 where it is stored, applied to address the load 16, or in the case where the storage element is full and the received energy exceeds the load 16 demand, shunted to ground to maintain voltage regulation.

The power conveyor circuit 12 is designed meet the power transfer requirements of the energy harvesting system 10. The input power level of the power conveyor circuit 12 advantageously is not a reflection of the required load power. Instead, the output power level of the power conveyor circuit 12 is a reflection of the input power received. That is, the output power is equal to the input power minus losses due to efficiency. All power received at the input port 24 of the power conveyor circuit 12 is conveyed to the output port 40 of the power conveyor circuit 12 regardless of the load 16 coupled to the output port 40. The operation of the power conveyor circuits shown in FIGS. 3, 4, and 6-10 is the same as described with respect to FIGS. 1 and 2, except as illustrated and described with the examples herein.

Accordingly, examples of the present technology provide a power conveyor circuit that may be utilized with energy harvesting systems to allow for harvested energy to be received at a prescribed impedance level to maximize harvesting efficiency of the energy harvesting system.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A power conveyor circuit for an energy harvesting system, the power conveyor circuit comprising:
    an input port configured to be electrically coupled to a sensor to receive an input signal from the sensor at an input power level;
    an output port configured to be electrically coupled to a load;
    a switch mode power path circuit coupled to the input port and the output port, wherein the switch mode power path circuit is configured to receive the input signal from the sensor received at the input port and to provide an output signal to the output port at an output power level equal to the input power level times a transfer efficiency regardless of the load coupled to the output port;
    a control input coupled to the switch mode power path circuit and configured to receive a control voltage and to impose an input voltage at the input port; and
    a voltage controller coupled to the input port and the control input, the voltage controller configured to maintain the input voltage at the input port equal to the control voltage.

2. The power conveyer circuit of claim 1, wherein the control voltage is provided based on a maximum power point tracking function.

3. The power conveyor circuit of claim 1, wherein the switch mode power path circuit comprises a modulator and an inductor.

4. The power conveyor circuit of claim 3, wherein the modulator comprises a first switch between an inductor output and a modulator output and a second switch between the inductor output and a ground.

5. An energy harvesting system comprising:
    a sensor configured to harvest energy;
    a power conveyor circuit electrically coupled to the sensor at an input port to receive an input signal from the sensor at an input power level, the power conveyor circuit further comprising:
    an output port configured to be electrically coupled to a load;
    a switch mode power path circuit coupled to the input port and the output port, wherein the switch mode power path circuit is configured to receive the input signal from the sensor received at the input port and to provide an output signal to the output port at an output power level equal to the input power level times a transfer efficiency regardless of the load coupled to the output port;
    a control input coupled to the switch mode power path circuit and configured to receive a control voltage and to impose an input voltage at the input port; and
    a voltage controller coupled to the input port and the control input, the voltage controller configured to maintain the input voltage at the input port equal to the control voltage.

6. The energy harvesting system of claim 5, wherein the sensor is configured to harvest solar, wind, vibration, of radiofrequency energy.

7. The energy harvesting system of claim 5, wherein the control voltage is provided based on a maximum power point tracking function.

8. The energy harvesting system of claim 5, wherein the switch mode power path circuit comprises a modulator and an inductor.

9. The energy harvesting system of claim 2, wherein the load comprises one of a battery, a capacitor, a super capacitor, or a filter cap.

10. The energy harvesting system of claim 8, wherein the modulator comprises a first switch between an inductor output and a modulator output and a second switch between the inductor output and a ground.

11. The energy harvesting system of claim 5 further comprising:
the load coupled to the output port of the power conveyor circuit.

12. A method of making a power conveyor circuit, the method comprising:
providing an input port configured to be electrically coupled to a sensor to receive an input signal from the power source at an input power level and an output port configured to be electrically coupled to a load;
coupling a switch mode power path circuit to the input port and the output port, the switch mode power path circuit configured to receive the input signal from the sensor received at the input port and to provide an output signal to the output port at an output power level equal to the input power level times a transfer efficiency regardless of the load coupled to the output port;
coupling a control input to the switch mode power path circuit, the control input configured to receive a control voltage and to impose an input voltage at the input port; and
coupling a voltage controller to the input port and the control input, the voltage controller configured to maintain the input voltage at the input port equal to the control voltage.

13. The method of claim 12, wherein the control voltage is provided based on a maximum power point tracking function.

14. The method of claim 12, wherein the switch mode power path circuit comprises a modulator and an inductor.

15. The method of claim 14, wherein the modulator comprises a first switch between an inductor output and a modulator output and a second switch between the inductor output and a ground.

* * * * *